United States Patent Office.

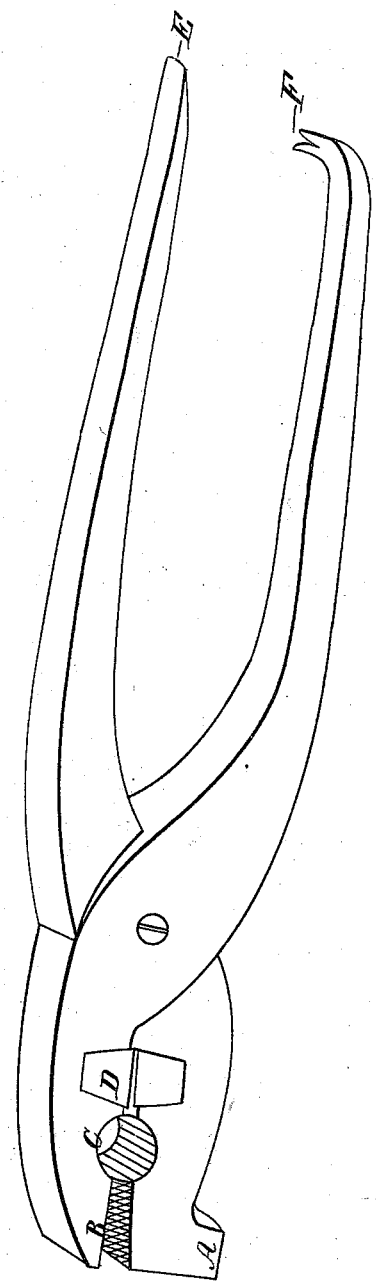

ERASTUS S. BENNETT, OF NEW YORK. N. Y., ASSIGNOR TO HIMSELF AND JUSTUS SMITH, OF SAME PLACE.

Letters Patent No. 87,754, dated March 16. 1869: antedated February 27, 1869.

IMPROVEMENT IN IMPLEMENTS.

The Schedule referred to in these Letters Patent and making part of the same.

*To all whom it may concern:*

Be it known that I, ERASTUS S. BENNETT, of the city, county, and State of New York, have invented a new and useful Household-Implement; and I do hereby declare that the following is a full and exact description thereof, reference being had to the accompanying drawings, and to the letters of reference marked thereon.

The nature of my invention consists in the arrangement, in one instrument, of the six most useful household-tools, viz, tack-hammer, pincers, holder, (or pipe-wrench,) wire-cutter, screw-driver, and tack-puller, in such a manner as that they shall not interfere with the use of each other, that there shall be no point of weakness, and that the greatest utility and durability shall be secured at the least expense.

I am aware that such implements are not novel, *per se*, and that the arrangement of even a greater number of tools in one instrument is not new; also, that some of the tools, which enter into my implement, have appeared in other implements; but to every such implement, which I have yet seen, there are serious objections, as, for instance, points of weakness, extra bulk and weight, the interference of one part with the convenient use of the other, the arrangement of otherwise useful tools with those of little or no use, the great cost of manufacture, &c.

It will be seen that in my implement each of these objections is obviated, and that, with but nominal extra expense of manufacture, I have arranged these most useful tools in a simple, convenient, and effective manner, which, while it gives the maximum of usefulness, strength, and simplicity, at the same time secures the minimum of bulk and manufacturing cost.

To enable others skilled in the art to make and use my invention, I will proceed to describe its construction and operation.

In the annexed drawings I have endeavored to represent a side and top view of the instrument, which has the general form and use of a pair of pincers, the jaws at B.

A piece of hardened steel is dovetailed into each jaw, at the back part, in such a way as that their edges, which are sharpened, meet, when the jaws are fully closed. These are set in the left side, and shown at D, for the purpose of cutting wire.

C shows apertures cut into the jaws, and furnished with corrugations, or teeth, running across the jaws, for the purpose of taking hold of pipe, or anything round, which is desired to be turned or held.

A represents a projection on the lower jaw, which is intended to be used as a tack-hammer, having the arms of the pincers for a handle.

E shows the end of one arm, which is shaped and sharpened as, and to be used for a screw-driver.

F, the end of the other arm, which is curved inward and made in the shape of a claw, to be used as a tack-puller.

What I claim as my invention, and desire to secure by Letters Patent, is—

The implement, consisting of the tack-hammer *a*, pincers B, holder *c*, wire-cutter D, screw-driver E, and tack-drawer F, when constructed and arranged as described.

E. S. BENNETT.

Witnesses:
JOHN JAMES,
R. C. MURRAY.